United States Patent [19]

Takemura

[11] Patent Number: 5,036,940

[45] Date of Patent: Aug. 6, 1991

[54] TRANSFER DIFFERENTIAL GEAR LOCK CONTROLLER

[75] Inventor: Motoi Takemura, Tokyo, Japan

[73] Assignee: Isuzu Motors Limited, Tokyo, Japan

[21] Appl. No.: 450,985

[22] Filed: Dec. 15, 1989

[30] Foreign Application Priority Data

Dec. 22, 1988 [JP] Japan ................. 63-321967

[51] Int. Cl.$^5$ ............................................. B60K 17/35
[52] U.S. Cl. ................................... 180/249; 475/231
[58] Field of Search ................. 180/249, 250, 248; 475/249, 237, 231

[56] References Cited

U.S. PATENT DOCUMENTS

| | | | |
|---|---|---|---|
| 3,765,261 | 10/1973 | Hobbins | 180/250 X |
| 3,848,691 | 11/1974 | Dolan . | |
| 3,923,113 | 12/1975 | Pagdin . | |
| 3,963,085 | 6/1976 | Vinton | 180/250 X |
| 4,432,431 | 2/1984 | Russell | 180/248 |
| 4,601,359 | 7/1986 | Weismann et al. | 180/248 X |
| 4,644,823 | 2/1987 | Mueller | 180/248 X |
| 4,768,399 | 9/1988 | Kubo et al. | 180/249 X |

FOREIGN PATENT DOCUMENTS 0212721 3/1987 European Pat. Off. ............ 180/248

Primary Examiner—Charles A. Marmor
Assistant Examiner—Kevin Hurley
Attorney, Agent, or Firm—Browdy and Neimark

[57] ABSTRACT

A transfer differential gear lock controller in accordance with the present invention interlocks a switching operation of a transmission device between a low speed range and to a high speed range with a differential gear lock operation, controls a center differential gear lock mechanism to a lock state by detecting the operation state of the transmission device in the low speed range and makes it possible for a driver to complete his operation with only one shift operation to the low speed range. The controller makes it also possible to select between the lock state and free state for the center differential gear lock mechanism in response to the detection of the operation state of the transmission device in the high speed range through the driver's operation. For, those vehicles which are directed primarily to off-road driving are generally of low and high two-speed type, but in the case of four-wheel drive vehicles equipped with the center differential gear, the center differential gear lock mechanism must be locked under the road surface condition where driving must be made in the low speed range.

2 Claims, 2 Drawing Sheets

TRANSFER DIFFERENTIAL GEAR LOCK CONTROLLER

BACKGROUND OF THE INVENTION

1. Field of the Invention

This invention relates to a transfer differential gear lock controller in full-time four-wheel drive vehicles.

2. Description of the Prior Art

Generally, when a vehicle turns a curve, a running distance of outer wheels is greater than a running distance of inner wheels. Therefore, two-wheel drive vehicles such as FF types and FR types are equipped with a differential gear to provide the driving wheels with the difference of rotation between the inside and the outside so that the vehicles can smoothly turn the curve. If a tire or tires on one side completely slip in the mud or the like, the tire or tires run merely idle and driving force is consumed only by the idle tire or tires but is not transmitted to the tire(s) which firmly grips the ground. To cope with this problem, vehicles are generally equipped with a mechanism which stops temporarily the function of the differential gear and transmits the driving force also to the tire gripping the ground or in other words, a differential gear lock mechanism, when the tire or tires on only one side turn idle excessively. In the full-time four-wheel drive vehicles, however, they must have a structure such that the four wheels generate the differences of rotation between them. Therefore, a device for distributing the driving force of an engine to the front and the back, that is, a center differential gear as a third differential gear is provided besides a front differential gear disposed between the front wheels and a rear differential gear disposed between the rear wheels. Furthermore, a center differential gear lock mechanism is provided to the center differential gear in order to prevent part of the tires from running idle.

An example of the conventional full-time four-wheel drive vehicles is disclosed, for example, in the specification and drawings of U.S. Pat. No. 3,848,691. In this full-time four-wheel drive vehicle, the driving force is inputted via a sub-transmission gear to a bevel gear type center differential gear disposed at the rear part of a transfer through a main shaft, the output of a front driving system is driven through a chain by a sprocket disposed at the front part of the center differential gear so as to transmit a torque to the front wheels and the output of the other rear driving system transmits a torque to the rear wheels via side gears of the center differential gear. A center differential gear lock mechanism of a spline-fitting type is disposed between the center differential gear and the sprocket. This center differential gear lcok mechanism is formed by providing a mechanical lock to the center differential gear. The mechanical differential lock is operated by a control lever or an actuator linked from the transfer.

U.S. Pat. No. 3,923,113 discloses a four-wheel drive vehicle in its specification and drawings. This four-wheel drive vehicle includes a viscous type differential limiter at the outer peripheral portion of a bevel gear type center differential gear which has the same function as the bevel gear type center differential gear in the full-time four-wheel vehicle described above.

In conjunction with the full-time transfer apparatus described above, those vehicles which are directed primarily to off-road driving are generally equipped with a high and low two speed type switching device or a two-range switching device for switching the speed change range to either a high speed range or a low speed range. In the full-time four-wheel drive vehicles in general, the differential gear lock must be brought into an operative state under the road surface condition where the vehicles must drive in the low range, in the case of the transfer equipped with the center differential gear. In such full-time four-wheel drive vehicles, it is necessary for a driver to conduct two kinds of operations, that is, the operation for switching the transmission from the high range to the low range and then the operation for operating the differential gear lock so as to lock the center differential lock mechanism.

In the bevel gear type center differential gear in the full-time four-wheel drive vehicles of the prior art described above, the torque transmitted to the main shaft of the transmission is transmitted to the center differential gear at a torque transmission ratio of 1:1 because the center differential gear is positioned at the rear part of the transfer. Particularly, the torque reduced in the low range is transmitted as it is. In such a case, a somewhat great torque is applied to the main shaft. Therefore, to secure the strength of the main shaft, any measures such as the increase of the diameter of the main shaft must be taken, thereby inviting the problems such as the increase in the weight of the main shaft and its cost of production.

In the full-time four-wheel drive vehicles described above, one of the sleeves of the center differential lock is connected to the side gear on the front driving side and the other, to a differential gear carrier of the center differential gear. Therefore, when the differential gear lock mechanism operates to attain the lock state, the torque transmission route becomes the front wheels→the front driving system→the sleeve of the differential gear lock mechanism→the differential gear carrier→the rear driving system→the rear wheels, and the tooth surfaces of the pinion of the center differential gear and of the side gears always receive the torque. In order to secure durability of the side gears and pinion of the center differential gear, therefore, the sizes of these gears must be increased to improve strength, and this disadvantageously increases cost, weight, space and so forth.

In connection with the structure of the center differential gear, the pinion is fixed to the differential gear carrier but the side gear of the front driving system and the side gear of the rear driving system are not housed inside the differential gear carrier. Accordingly, the back lash occurring between the pinion and the side gears of the center differential gear results in the occurrence of abnormal sound during driving such as the gear striking sound due to the back lash of the bevel gear or the pinion in the case of the full-time four-wheel drive vehicles. Though the control of the back lash is indispensable in such a center differential gear, repetition of the total disassembly and assembly of the transfer portion becomes necessary at the time of selection of washers and the like that are disposed as measures for each side gear thrust surface, makes the assembly more troublesome and is not desirable from the aspect of productivity.

In the four-wheel drive vehicles described above, a viscous coupling is disposed at the outer peripheral portion of the bevel gear type center differential gear. Accordingly, in addition to the problems with the full-time four-wheel drive vehicles described above, this invites another problem that the dimension in the radial direction becomes greater, though the space in an axial direction can be reduced advantageously, and this presents a serious problem particularly in the case of a front-engine rear-drive type vehicle because the space between it and a floor tunnel is limited.

SUMMARY OF THE INVENTION

It is therefore an object of the present invention to provide a transfer differential gear lock controller which solves the problems described above, which interlocks electrically the switching operation of the center differential gear lock mechanism between the lock side and the free side with the speed change switching operation of the transmission from the high speed range to the low speed range in the full-time four-wheel drive vehicles so that the lock state of the center differential lock mechanism can be operated automatically and in synchronization with the switching operation of the transmission to the low speed range and the operation of the driver can be simplified; which can switch the center differential gear lock mechanism to the lock side when the driver merely operates the transmission to the low speed range because the actuator operates simultaneously; and which can control the center differential gear lock mechanism to switch it to either the lock side or the free side in response to the switching operation by the driver to the high speed range so that the lock state and free state of the center differential gear lock mechanism in the high speed range can be operated by the driver's selection.

It is another object of the present invention to provide a transfer differential gear lock controller including a transmission for switching an input shaft to either a high speed range where it is directly coupled to a main shaft or a low speed range where it is coupled to the main shaft through a counter shaft, a center differential gear one of the output shafts of which is connected to the main shaft and to a front driving shaft and the other of the output shafts of which is connected to a rear driving shaft, a center differential gear lock mechanism which is disposed between both the driving shafts, and an actuator for effecting the switching operation of the center differential gear lock mechanism in response to the switching operation of the transmission in the interlocking arrangement with the operation of the center differential gear lock mechanism.

It is still another object of the present invention to provide a transfer differential gear lock controller including a speed change range detection switch as speed change range detection means for detecting the operation state in the high and low speed ranges in the transmission and for switching the operation to the high or low speed range and a differential gear lock detection switch as differential gear lock detection means for detecting the lock state and free state of the center differential gear lock mechanism and switching it to the lock state or the free state, and wherein the differential gear lock detection switch turns on the lock side in response to switching of the speed change range detection switch to the low speed range side, the actuator operates the center differential gear lock mechanism to the lock state, and the differential gear lock detection switch can be switched to either a lock contact or a free contact in response to switching of the speed change range detection switch to the high speed range.

It is still another object of the present invention to provide a transfer differential gear lock controller having the construction wherein when the transmission is switched to the high speed range, the center differential gear lock mechanism can be selectively switched to either the lock side or the free side in accordance with the will of the driver by operating a push button or the like, the operation state can be switched to the differential gear lock state in accordance with the will of the driver in the speed change range in the high speed range so as to synchronize the torque transmission state of the front wheels with that of the rear wheels or to the free state so as to distribute the torque to the front wheels and the rear wheels by the center differential gear and a viscous differential limiter is operated so as to absorb automatically the relative rotation between the front wheels and the rear wheels, thereby attaining the torque transmission state where the differential operation of the center differential gear can be limited.

It is still another object of the present invention to provide a transfer differential gear lock controller having the construction wherein a bevel gear type center differential gear disposed at the front part of the transfer portion is connected to the main shaft; side gears are disposed inside a center differential cage of the center differential gear and one of the side gears is connected to the front driving shaft with the other being connected to the rear driving shaft; the torque transmitted to the front driving shaft and to the rear driving shaft is made smaller than the input torque so that the size of each driving shaft can be reduced and various components fitted to each driving shaft, such as front driving sprockets, viscous clutches, bearings, center differential gear lock mechanism, etc. can be made compact and moreover, the center differential gear can be constructed as one assembly; and the back lash adjustment between the gears of the center differential gear can be made easily by replacing thrust washers disposed between the center differential gear cage and the side gears.

It is still another object of the present invention to provide a transfer differential gear lock controller having the construction wherein, since the center differential gear, the center differential gear lock mechanism and the viscous differential limiter are disposed between the front driving shaft and the rear driving shaft, the difference of the tire diameters under the vehicle state and the torsional torque occurring between the front wheels and the rear wheels at the time of cornering are eliminated because the viscous differential limiter absorbs automatically the relative rotation between the front wheels and the rear wheels to limit the differential operation of the differential gear when the center differential gear lock mechanism is not engaged, and when the center differential gear lock mechanism is engaged, the front wheels and the rear wheels are mechanically coupled or in other words, the differential gear lock state is established and the interlocked driving state is established.

It is a further object of the present invention to provide a transfer differential gear lock controller having the construction wherein the viscous differential limiter for absorbing the relative rotation between the front wheels and the rear wheels is directly assembled between the front driving shaft and the rear driving shaft and is operated between the front wheels and the rear wheels, is disposed on the same axis as that of the center differential gear so as to reduce the size in a radial direction; this arrangement position of the viscous differential limiter reduces the number of relative rotations between the front wheels and the rear wheels so that the volume of the viscous differential limiter can be reduced or if a limiter having the same volume is used, a greater torque can be generated, thereby accomplishing the reduction of cost and size; the transmission of the torsional torque generated between the driving shafts to the differential gear of the center differential gear is prevented so as to attain the reduction of the size of the differential gear; and the relative rotation between the front wheels and the rear wheels can be absorbed automatically by the viscous differential limiter without any operation by the driver.

DESCRIPTION OF THE PREFERRED EMBODIMENT

Figure 1:
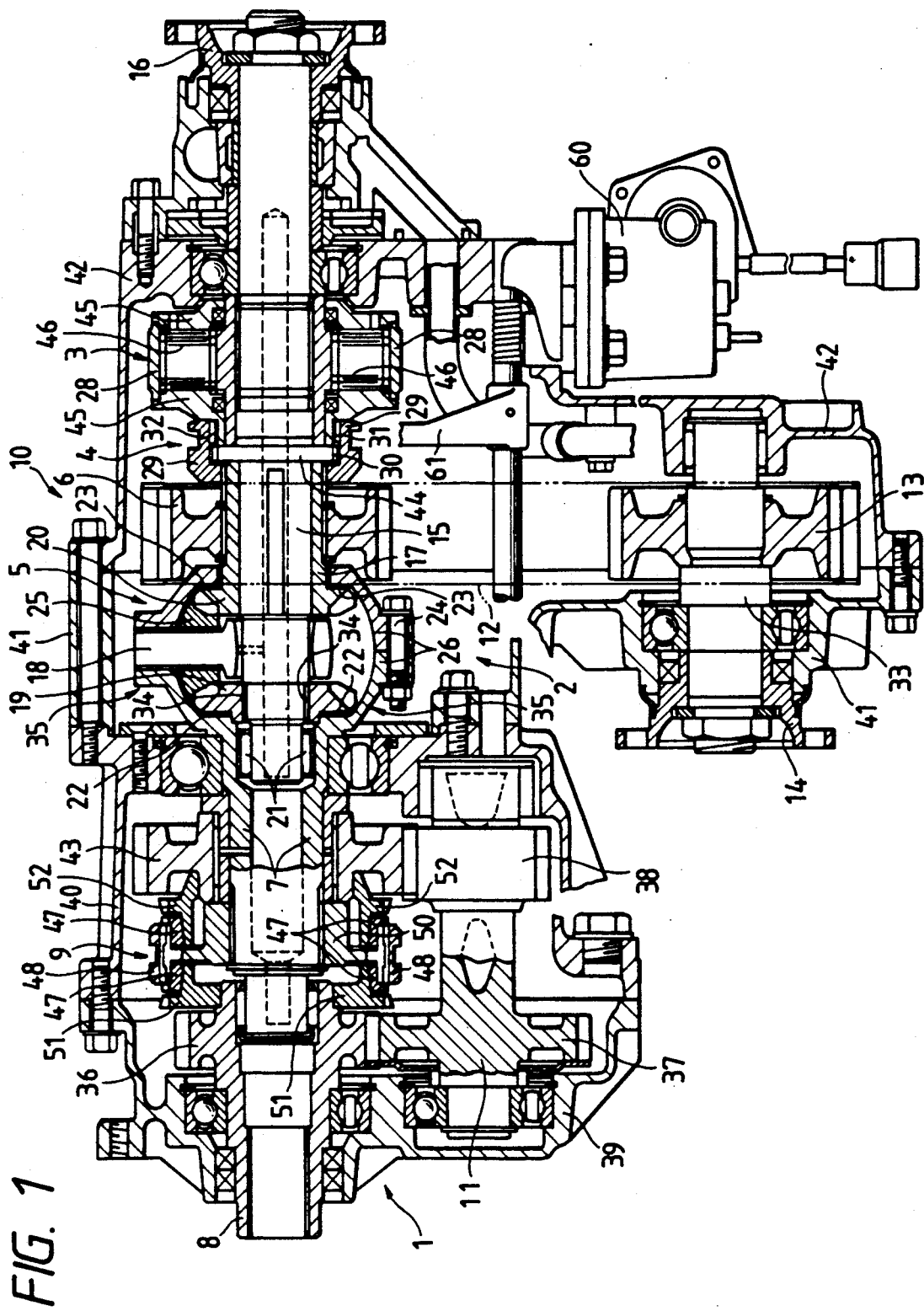
FIG. 1 is a sectional view showing an embodiment of a transfer differential gear lock controller in accordance with the present invention.

Hereinafter, an embodiment of a transfer differential gear lock controller in accordance with the present invention will be explained with reference to FIG. 1. FIG. 1 shows a transfer apparatus 10 for a full-time four-wheel drive vehicle which incorporates this transfer differential gear lock controller. As shown in the drawing, the transfer apparatus 10 consists of a transmission portion 1 and a transfer portion 2. A case for storing transmission portion 1 and transfer portion 2 comprises transmission portion cases 39, 40 consisting primarily of two portions for storing the transmission portion 1 and transfer cases 41, 42 consisting primarily of two portions for storing the transfer portion 2.

The transmission portion 1 comprises an input shaft 8 to which the driving force of an engine is inputted through a clutch or the like, a main shaft 7 which functions as an output shaft, a synchronizing device 9 as a connecting device which is disposed between the input shaft 8 and the main shaft 7, and a counter shaft 11. The counter shaft 11 is equipped with a gear 37 as a first gear which always meshes with an input gear 36 formed on the input shaft 8, and a gear 38 as a second gear which always meshes with a gear 43 fitted rotatably to the main shaft 7. When the transmission portion 1 is constructed as described above, the transmission in the transmission portion 1 can be switched to either a high speed range where the input shaft 8 is directly coupled with the main shaft 7 and a low speed range where they are coupled through the counter shaft 11.

In other words, when a sleeve 48 of the synchronizing device 9 is moved to the left in the drawing, the sleeve 48 meshes with a clutch gear 51 which is spline-fitted to an input gear 36 through a synchronizing ring 47. Therefore, power transmission is made through the input shaft 8→the input gear 36→the clutch gear 51→the synchronizing ring 47→the sleeve 48→a clutch hub 50 spline-fitted to the main shaft 7→the main shaft 7. Thus, a high range where the input shaft 8 is directly coupled to the main shaft 7 or in other words, a transmission range of a high speed range, is established.

When the sleeve 48 of the synchronizing device 9 is moved to the right in the drawing, the sleeve 48 meshes with the clutch gear 52 which is spline-fitted to the gear 43 through the synchronizing ring 47. Accordingly, power transmission is made through the input shaft 8→the input gear 36→the gear 37→the counter shaft 11→the gear 38→the gear 43→the clutch gear 52→the synchronizing ring 47→the sleeve 48→the clutch hub 50→the main shaft 7. Thus, a low range where the input shaft 8 is coupled to the main shaft 7 through the counter shaft 11, that is, a transmission range of a low speed range, is established.

In the transfer portion 2, a bevel gear type center differential gear 5 is disposed at its foremost portion, a viscous clutch 3 as a viscous differential limiter for absorbing automatically the relative rotation between front wheels and rear wheels is disposed at the rearmost portion on the same axis as that of the center differential gear 5 and a sprocket 6 for front driving and a center differential gear lock mechanism 4 are disposed between the center differential gear 5 and the viscous clutch 3. To constitute a later-appearing front driving system, the sprocket 6 for front driving is constituted in such a manner that the driving force can be transmitted to a sprocket 13 for front driving through a chain 12.

The bevel gear type center differential gear 5 assembled in this transfer device 10 comprises a center differential gear cage 35 which is formed by fixing a differential gear carrier 26 connected to the main shaft 7 and another differential gear 26 by bolts in such a manner as to keep contact with each other, a pinion shaft 18 fitted to this center differential gear cage 35, a pinion 25 fitted rotatably to this pinion shaft 18 and side gears 19, 20 on both sides that are stored in the center differential gear cage 35 and mesh with the pinion 25.

One of the side gears 20 forms a hollow front driving shaft 17 and the sprocket 6 for front driving is spline-fitted to the outer periphery of this front driving shaft 17. In the drawing, the side gear 20 and the front driving shaft 17 are shown formed integrally but such a construction is not particularly limitative. Therefore, the side gear may of course be spline-fitted on the front driving shaft and in short, the side gear 20 and the front driving shaft 17 may be connected in such a manner as to be capable of transmitting the driving force.

The other side gear 19 is spline-fitted (at the portion represented by reference numeral 34) to a rear driving shaft 15 which penetrates through the center differential gear 5, the front driving shaft 17 and the viscous clutch 3. The rear driving shaft 15 is supported by the main shaft 7 through a bearing 21. In this center differential gear 5, a thrust washer 22 is interposed between the center differential gear cage 35 and the side gear 19 and another thrust washer 23 is interposed between the center differential gear cage 35 and the side gear 20. These thrust washers 22, 23 have the function of a kind of an adjustment shim, and are constructed so that they can be replaced by those washers having a suitable thickness in order to optimize the backlash occurring between the pinion 25 and the side gears 19, 20.

In the bevel gear type center differential gear 5, therefore, one of the driving forces transmitted to the side gear 19 is transmitted to a rear companion flange 16 through the rear driving shaft 15 of the rear driving system fitted to the side gear 19 by a spline 34 and then to rear wheels from this rear comparison flange 16 through a rear propeller shaft, rear differential gears, and the like. The other driving force transmitted to the side gear 20 is transmitted to a front companion flange 14 from a front driving shaft 17 of the front driving system constituted integrally with the side gear 20 through the sprocket 6 for front driving which is spline-fitted to the front driving shaft 17, the chain 12, the sprocket 13 for front driving and the driving shaft 33, and further to the front wheels from the front companion flange 14 through a front propeller shaft, front differential gears, and the like.

The center differential gear lock mechanism 4 incorporate in this transfer apparatus 10 comprises a center differential gear lock sleeve 29 spline-fitted to the front driving shaft 17, a spline 30 formed on a ring 44 under the fitted state to the rear driving shaft 15, and a case 45 equipped with a spline 31 which always meshes with the spline 32 of the center differential gear lock sleeve 29. This case 45 is fixedly fitted mutually to an outer hub 28 of the viscous clutch 3 as a viscous differential limiter. The operation of this center differential lock mechanism 4 can shift the center differential gear lock sleeve 29 in the axial direction when the actuator 60 is operated so as to move a shift fork 61 meshing with a ring-like groove of the center differential lock sleeve 29 in the axial direction. When the center differential gear lock sleeve 29 exists at the position shown in the drawing, its spline 32 meshes with the spline 31 of the case 45 in this center differential lock mechanism 4 but does not mesh with the spline 30 of the ring 44 fixed to the rear driving shaft 15. In the state shown in the drawing, therefore, the state is not the differential gear lock state but is the state in which the viscous clutch 3 as the viscous differential limiter operates. In contrast, when the actuator 60 is operated and the center differential gear lock sleeve 29 is moved to the left from the position shown in the drawing by the shift fork 61 so that the spline 32 of the center differential gear lock sleeve 29 meshes with the spline 30 of the ring 44 of the rear driving shaft 15 and with the spline 31 of the case 45, the center differential gear lock mechanism 4 enters the differential gear lock state. Accordingly, since the center differential gear lock mechanism 4 is in the differential gear lock state, it connects the front driving shaft 17 and the rear driving shaft 15 mechanically and directly and the state where the rear wheels and the front wheels are coupled mechanically directly, that is, the direct coupling state in which torque transmission is interlocked, is established.

Next, the viscous clutch 3 as the viscous differential limiter incorporated in this transfer apparatus 10 will be explained. This viscous clutch 3 is the one that absorbs automatically the relative rotation between the front wheels and the rear wheels on the same axis as that of the center differential gear 5. The viscous clutch 3 consists of a larger number of disc-like plates 46 and a silicon oil that are sealed inside a case consisting of an outer hub 28 as a viscous outer hub, an inner hub 27 as a viscous inner hub and cases 45 on both sides. These plates 46 constitute the inner plates spline-fitted to the outer peripheral portion of the inner hub 27 and the outer plates spline-fitted to the inner peripheral portion of the outer hub 28. The outer hub 28 is always connected in the interlocking arrangement with the front driving shaft 17 through the case 45 and the center differential gear lock sleeve 29. The inner hub 27 is spline-fitted in the interlocking arrangement with the rear driving shaft 15. Accordingly, when the center differential gear lock sleeve 29 moves to the position on the right shown in the drawing due to the operation of the actuator 60, the spline 32 of the center differential gear lock sleeve 29 and the spline 30 of the ring 44 fixed to the rear driving shaft 15 do not mesh with each other and in this case, the center differential gear lock mechanism is not under the differential gear lock stage. Therefore, the viscous clutch 3 plays the function of automatically absorbing the relative rotation between the front wheels and the rear wheels or in other words, limits the operation of the center differential gear 5.

Figure 3:
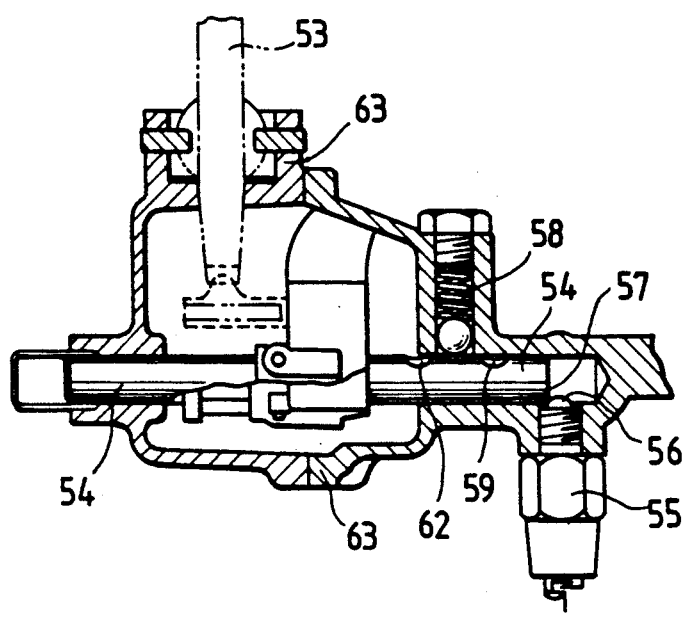
FIG. 3 is a sectional view showing an example of the structure of a speed change range detection switch of the transmission shown in FIG. 1.

Next, an example of a detection device of the transmission incorporated in the transfer differential gear lock controller of the present invention, that is, a detection device for detecting whether the transmission of the transmission portion 1 is switched to a high speed range or to a low speed range, will be described with reference to FIG. 3. This detection device consists of a shift operation lever 53 fitted to a case 63, a shift rod 54 operated by the shift operation lever 53 and capable of sliding inside the case 63 and a speed change range detection switch 55 as speed change range detection means capable of detecting a low range or a low speed range, disposed in the case 63. A high speed range recess 59 which anchors an engagement member 58 disposed on the case 63 when it is shifted to the high speed range and a low speed range recess 62 for anchoring the engagement member 58 when it is shifted to the low speed range are formed on the shift rod 54. A shoulder 57 is formed on the shift rod 54 by cutting its end portion. Therefore, when the shift rod 54 is moved by the shift operation lever 53 to the right in the drawing or to the low speed range and the engagement member 58 is anchored to the low speed range recess 62, the shoulder 57 formed on the shift rod 54 pushes a projection 56 of the speed change range detection switch 55. In this manner the speed change range detection switch 55 detects that the transmission is shifted to the low speed range.

Figure 2:
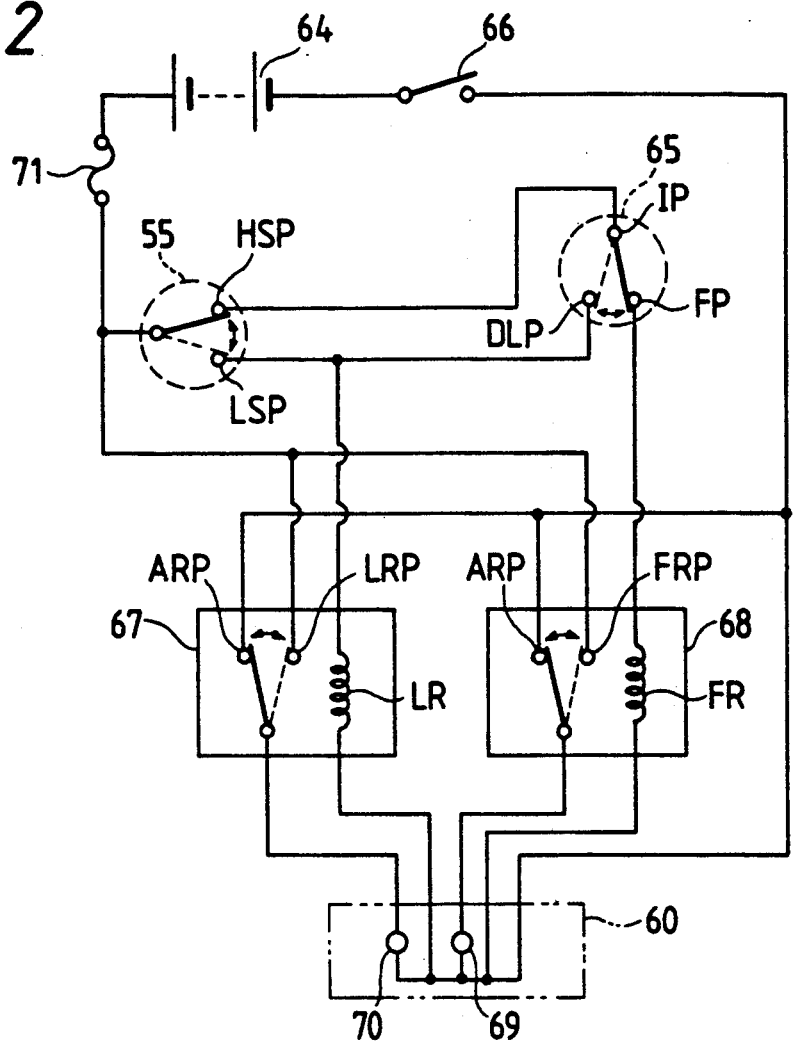
FIG. 2 is an electric circuit diagram showing an example of a control circuit of the center differential gear lock mechanism shown in FIG. 1.

Next, an example of the electric circuit for controlling the center differential gear lock mechanism 4 assembled into the transfer differential gear lock controller of the present invention will be explained with reference to FIG. 2. When the shift fork 61 is slid and moved by the operation of the actuator 60, the center differential gear lock sleeve 29 in the center differential gear lock mechanism 4 is switched to the differential gear lock side where the center differential gear lock sleeve 29 is engaged with the spline 30 of the ring 44 fixed to the rear driving shaft 15 and to the free side where it is engaged with the spline 30. An example of the actuator 60 is equipped with differential gear lock means for moving the center differential gear lock sleeve 29 to the lock side and lock release means 69 for moving it to the free side. A power source 64, an ignition switch 66 and a fuse 71 are assembled in the control electric circuit for controlling the operation of this actuator 60. Furthermore, the speed change range detection switch 55 as the speed change range detection means for switching the operation state to the high or low speed range by detecting the operation state between the high speed range and the low speed range in the transmission and the differential gear lock detection switch 65 as the differential gear lock means for detecting the lock state and the free state of the center differential gear lock mechanism 4 and switching the operation state to the lock state or the free state are connected to this control electric circuit. The speed change range detection switch 55 includes a high speed range detection contact HSP and a low speed range detection contact LSP. When the shift lever or a push button is operated by a screw driver so as to slide and move the sleeve 48 of the synchronizing device 9, this speed change range detection switch 55 is switched to either one of the high speed range detection contact HSP and the low speed change range detection contact LSP. The differential gear lock detection switch 65 includes a differential gear lock contact DLP which sets the center differential gear lock mechanism 4 to the differential gear lock state and a differential gear free contact FP which sets it to the free state and is switched to either one of these contacts. A contact IP on the input side of this differential gear lock detection switch 65 is connected to the high speed change range detection contact HSP of the speed change range detection switch 55. Furthermore, the low speed range detection contact LSP and the differential gear lock contact DLP are always connected to each other and are connected to the actuator 60 through a relay winding LR of a relay 67 on the lock side. When a current flows through the relay winding LR in the relay 67 on the lock side, the circuit is switched from an earth contact ARP of the electric circuit to the relay contact LRP on the lock side (change-over represented by dotted line in the drawing). The free contact FP of the differential gear lock detection switch 65 is connected to the actuator 60 through the relay winding FR of the relay 68 on the free side. When a current flows through the relay winding FR in the relay 68 on the free side, the circuit is switched from the earth contact ARP of the electric circuit to the relay contact FRP on the free side (change-over to the side represented by dotted line in the drawing).

The transfer differential gear lock controller of the present invention has the construction such as described above. Next, the operation of this transfer differential gear lock controller will be explained with reference to FIGS. 1, 2 and 3.

First of all, in the full-time transfer apparatus 10, the driving force from the engine is inputted to the main shaft 7 as the output shaft by the switching operation of the transmission of the transmission portion 1 either through the high speed range power transmission system or through the low speed range power transmission system described above. The driving force inputted to this main shaft 7 is inputted to the bevel gear type center differential gear 5 in the transfer portion 2 and is transmitted in this center differential gear 5 from the differential gear carrier 26 forming the center differential gear cage 35 to the pinion 25 through the pinion shaft 18. The driving force transmitted to this pinion 25 in the center differential gear 5 is distributed to the front driving system and to the rear driving system by the side gears 19 and 20 in the center differential gear 5.

The transfer apparatus is mounted mainly to off-road vehicles and is equipped with the two range switch device for switching either to the high speed range or to the low speed range as described above. In the case of the transfer equipped with the center differential gear, the differential gear lock must be brought into the operative state under the road surface condition where the vehicles must run in the low range. Therefore, when a driver operates the shift operation lever 53 and changes the shift rod 54 to the low speed range, the shift fork (not shown) slides and moves the sleeve 48 of the synchronizing device and this sleeve 48 meshes with the clutch gear 52 spline-fitted to the gear 43 through the synchronizing ring 47, that is, the dog teeth. Therefore, the power transmission system becomes the input shaft 8→the input gear 36→the gear 37→the counter shaft 11→the gear 38→the gear 43→the clutch gear 52→the synchronizing ring 47→the sleeve 48→the clutch hub 50→the main shaft 7, and the speed change range becomes the low speed range where the input shaft 8 is connected to the main shaft 7 through the counter shaft 11. At this time the speed change range detection switch 55 is connected to the low speed range detection contact LSP and this low speed range detection contact LSP and the differential gear lock contact DLP of the differential gear lock detection switch 65 are connected automatically to the relay winding LR in the relay 67 on the lock side. Accordingly, the current flows through the relay winding LR in the relay 67 on the lock side and the contact is switched from the earth contact ARP to the relay contact LRP on the lock side (the change-over represented by dotted line in the drawing). When the relay contact LRP on the lock side is connected to the positive side of the power source 64, the differential gear lock means 70 in the actuator 60 operates and moves the center diefferential gear lock sleeve 29 towards the lock side. In consequence, this center differential gear lock mechanism 4 is under the differential gear lock state where the front driving shaft 17 and the rear driving shaft 15 are coupled with each other directly and mechanically. There is thus established the torque transmission state where the rear wheels and the front wheels are coupled mechanically and directly.

When the driver operates the shift operation lever 53 and shifts the shift rod 54 to the high speed range, the shift fork (not shown) meshes with the clutch gear 51 spline-fitted to the input gear 36 through the synchronizing ring 47. Therefore, the power transmission is made through the input shaft 8→the input gear 36→the clutch gear 51→the synchronizing ring 47→the sleeve 48→the clutch hub 50 spline-fitted to the main shaft 7→the main shaft 7 and the speed range becomes the high speed range where the input shaft 8 is coupled directly to the main shaft 7. At this time the speed change range detection switch 55 is changed over to the high speed range detection contact HSP and this high speed range detection contact HSP is connected to the differential gear lock detection switch 65.

However, since the differential gear lock detection switch 65 is constituted such that it can be selectively switched by the driver, when the driver wishes to lock the center differential gear lock mechanism 4 and switches the differential gear lock detection switch 65 to the differential gear lock contact DLP, the high speed range detection contact HSP is connected to the relay winding LR in the realy 67 on the lock side through the differential gear lock detection switch 65. Therefore, the center differential gear lock mechanism 4 enters the differential gear lock state in the same way as the operation state of the low speed range described above, thereby connecting the front driving shaft 17 and the rear driving shaft 15 mechanically and directly and establishing the torque transmission state where the rear wheels and the front wheels are connected mechanically and directly.

In contrast, when the driver switches the differential gear lock detection switch 65 to the free contact FP as he does not want to lock the center differential gear lock mechanism 4 while the car is running in the high speed range, the free contact FP is connected to the relay winding FR of the relay 68 on the free side. Therefore, the current flows through the relay winding FR of the relay 68 on the free side and the contact is switched from the earth contact ARP to the relay contact FRP on the free side (the change-over to the side represented by dotted line in the drawing). When the relay contact FRP on the free side is connected to the positive side of the power source 64, the lock release means 69 in the actuator 60 operates and moves the center differential gear lock sleeve 29 to the free side. Accordingly, the center differential gear lock mechanism 4 is in the free state where the differential gear lock is released. Accordingly, the transfer apparatus 10 distributes the driving force transmitted to the center differential gear 5 to the front driving system and to the rear driving system by the function of the center differential gear 5 through the side gears 19 and 20 in the center differential gear 5 and the viscous type differential limiter, that is, the viscous clutch 3, absorbs automatically the relative rotation between the front wheels and the rear wheels, thereby limiting the operation of the center differential gear 5.

What is claimed is:

1. A transfer differential gear lock controller having:
   an input shaft to which the driving force of an engine is transmitted;
   a transmission device connected to said input shaft having a speed change stage of a high speed range and a speed change stage of a low speed range;
   switch means for switching between the speed change stage of said high speed range and that of said low speed range of said transmission device;
   a center differential gear connected to said transmission device, said center differential gear distributing the deriving force to a front driving shaft connected operatively to one of the output shafts of said center differential gear and to a rear driving shaft connected operatively to the other of the output shafts of said center differential gear;
   a center differential gear lock mechanism interposed between said front driving shaft and said rear driving shaft and switched to a free state where said center differential gear is operated and a lock state where said center differential gear is not operated; and
   an actuated for switching said center differential gear lock mechanism to one of said differential gear lock state and said free state; comprising:
   speed change range detection means for detecting to which of said high speed range and said low speed range of said transmission device the speed change state is switched by the operation of said switch means;
   means for operating said actuator in such a manner as to bring said center differential gear lock mechanism into said differential gear lock state when said speed change range detection means detects said low speed range; and
   means for operating said actuator so that said center differential gear lock mechanism can be switched to any one of said differential gear lock state and said free state when said speed change range detection means detects said high speed range.

2. A transfer differential gear lock controller according to claim 1, wherein said speed change detection means is a speed change range detection switch having a high speed range detection contact and a low speed range detection contact.

* * * * *